Sept. 10, 1940.  L. A. CAMEROTA  2,214,271
VALVE ACTUATION
Filed April 13, 1939
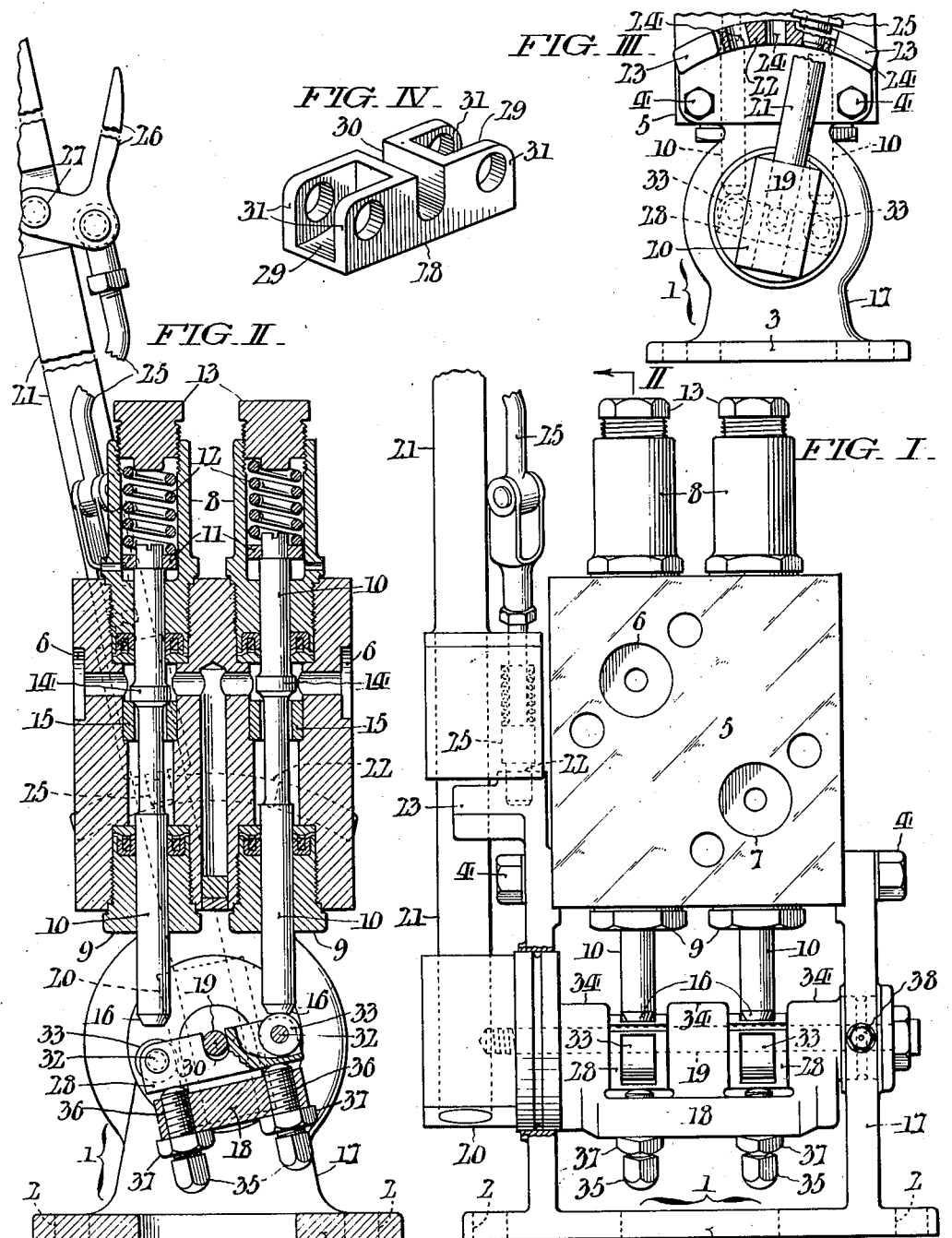
WITNESSES:
INVENTOR:
Louis A. Camerota,
BY
ATTORNEYS.

Patented Sept. 10, 1940

2,214,271

UNITED STATES PATENT OFFICE 2,214,271

VALVE ACTUATION

Louis A. Camerota, Burlington, N. J., assignor to Florence Pipe Foundry & Machine Company, Florence, N. J., a corporation of New Jersey Application April 13, 1939, Serial No. 267,631

5 Claims. (Cl. 74—104)

This invention has general reference to valve actuation and, more particularly, relates to the operation of spindle valves used in pressure fluid systems for controlling the motivation of machine tools and so forth.

Valves of the type referred to are commonly actuated by bell-crank or suitable tappet means coactive with the one extremity of the spindle or spindles, and such means generally impart a side or misaligning thrust of considerable intensity to said spindle or spindles, with resultant deflection and damage thereof in the region proximate the point of application of the thrust effect.

The fundamental aim of the present invention is to avoid the noted deflective tendency by provision of an actuator means effective to impart a direct axial thrust to the spindle valves, whereby friction is reduced to the minimum, efficiency in operation enhanced, local wear of the valve stem is eliminated, and the necessity for frequent adjustment of parts is eliminated.

Other objects and ancillary advantages achieved by this invention will be apparent from the following description of a typical embodiment thereof illustrated in the accompanying drawing, while the novel features are more specifically defined in the concluding claims.

In the drawing:

Fig. I is an elevation of a balanced spindle valve assembly including the present invention with parts of the control lever and bolting means broken out for simplification of the showing.

Fig. II is a vertical section, taken approximately as indicated by the arrows II—II in Fig. I.

Fig. III is a fragmentary view on a reduced scale from the reverse side of the lower portion of Fig. II and with part in section to better show otherwise covered parts; and Fig. IV is a perspective view of a detail hereinafter fully described.

Referring more in detail to the drawing, the reference 1 comprehensively indicates a support adapted for fixture where desirable by securing means, not shown, engaged through holes 2 in the base flange 3. Attached to the support 1 as by screws 4 is a distributor block 5, to which opposed pressure connections, not shown, are attachable at 6, with similar exhaust connections connectable at 7, in accordance with known practice.

The distributor block 5 is provided with conventional fittings 8, 9, affording packed guidance for the spindle valves 10, each of which is fitted at the upper end with a collar 11 for abutment by a spring 12, adjustable by a screw plug 13. Intermediate the ends of the spindle valves 10, they are provided with enlargements 14 coactive with inset sleeve seats 15, and at their lower ends they are circumferentially beveled at 16 for a purpose later on explained.

Transversely journaled between the spaced upright portions 17 of the support 1 is a saddle structure 18 having a through shaft or spindle 19, to one end of which is fixed the foot-piece 20 of the operating lever 21; and above said footpiece the adjoining upright 17 is provided with a laterally projecting sector 22 having end stops 23 for limiting the angular movement of the lever 21. Intermediate the stops 23 the sector 22 is provided with spaced holes 24 for reception of the end of a conventional bolt 25 having a trigger 26 at its upper end pivoted at 27 to the operating lever 21, and whereby the latter's position is controlled for manipulating the spindle valves 10, in an obvious manner.

In order to positively ensure direct axial thrust being applied at all times upon the spindle valves 10, use is made of a rockable member 28, shown as a detail in Fig. IV, for each associated pair of spindle valves 10. Each member 28, it will be seen, is somewhat in the form of a shoe embodying complemental recesses 29, separated by a median portion having therein a transverse opening in the form of a groove 30, and said recesses are flanked by apertured walls 31, affording bearing for stationary axes 32 on which are freely rotative rollers 33. It is also to be remarked, more particularly from Figs. I and II, that each rock-member 28 is disposed between spaced walls 34 of the saddle structure 18, with the grooves 30 therein accommodating the shaft or spindle 19; and that each said member is adjustably-supported by screws 35, engaged in correspondingly-threaded holes 36 in the saddle structure 18, and having lock-nuts 37 whereby they are fixable at any desired adjustment. It is to be particularly noted that by provision of the rock members 28, the respectively associated spindle valves 10 can be accurately adjusted by the screws 35 to any desired "lift." Furthermore, by provision of the rollers 33, and spacing of their axes of rotation in conformity with the spacing of longitudinal axes of the valves 10, the thrust will always be in direct alignment with said latter axes, and side thrusts effectively prevented. Lubricator fittings 38 are provided when necessary to reduce friction to the minimum.

In operation, the part 18 serves as the primary operator for moving longitudinally each of the valve spindles or rods 10, which are shown at opposite sides of the rocking axis of this part 18, while the parts 28 serve as the direct actuators for these valve spindles, being interposed between the operator 18 and the valve spindle ends 16, as is apparent from Fig. II. The transverse walls 34 of the saddle-like operator 18 guide the actuators 28 in lateral or angular movement relative to the rocking axis; and the set screws 35 (which take through the active portions of the part 18 behind the parts 28, at opposite sides of the rocking axis) serve to adjust the parts 28 laterally or angularly relative to the part 18 and its axis, and thus to adjust the lift of the valve spindles 10 by the operator 18 when it is rocked or oscillated; but the engagement of the axial shaft 19 with the guideways afforded by the grooves 30 in said actuators 28 prevents bodily shifting of said actuators 28 lengthwise of the guide means 34, transversely of the axis of rocking movement of the operator 18.

Having thus described my invention, I claim:

1. Actuating means for an associated pair of spindles comprising manipulating means, a rockable saddle with an adjustable inset member in the form of a shoe having a medial positioning opening and complemental spaced recesses, and freely rotative rollers journaled in said recesses for direct axial coaction with the spindle ends.

2. Actuating means for a pair of spindles comprising a transversely-pivoted rockable-saddle, said spindles being respectively located to each side of the saddle pivot; an actuator shoe shiftable laterally relative to the saddle pivot and interposed between the ends of the spindles and the saddle, said actuator shoe having a medial opening coactive with the saddle pivot; anti-friction means carried by the shoe engageable with the end of the respective spindles for effecting their longitudinal movement without exerting side thrust thereon and also rockable with the saddle; and means for adjusting the actuator shoe relative to the saddle for varying the lift of the respective valve spindles.

3. The combination of claim 2 wherein the pivoted saddle embodies guide means transverse to its pivotal axis, and the actuator shoe engages with said guide means and with means to prevent bodily shifting of the actuator shoe lengthwise of the guide means, while permitting it to move laterally, and the means for adjusting the actuator shoe relative to the saddle comprise screws associated with one of said parts for coaction with the other.

4. Actuating means for associated pairs of longitudinally movable spindles comprising a journaled saddle for coaction with the spindles at opposite sides of the saddle journal for movement thereby; spaced walls transversely of the saddle for individual actuator shoes engageable with the respective pairs of spindles and shiftable laterally relative to the journal axis, said shoes being interposed between the ends of the spindles and the saddle; spaced anti-friction means in each shoe engageable with associated pairs of the spindle lower ends and being rockable with the saddle; and individual means for angularly-adjusting the respective actuator shoes relative to the saddle and its journal axis, so as to vary the lift of the coactive spindles when moved by the saddle.

5. In actuating means comprising a pivotal saddle having active portions at opposite sides of the pivot axis with an associated pair of longitudinally movable spindles likewise at opposite sides of said axis; the combination of a shaft extending lengthwise of the saddle between its active portions; an actuator shoe interposed between the ends of the spindles and the active portions of the saddle, said shoe having a transverse guideway engageable with the shaft aforesaid to permit lateral shifting and angular movement of the actuator shoe relative to said shaft and the saddle; spaced anti-friction rollers in the actuator shoe for axially engaging the ends of the spindles; and screws, passed through the active portions of the saddle at opposite sides of its pivot axis, with associated lock nuts, for engaging the actuator shoe and variably adjusting it angularly relative to said saddle pivot axis.

LOUIS A. CAMEROTA.